(12) United States Patent
Hudson et al.

(10) Patent No.: US 6,993,540 B2
(45) Date of Patent: Jan. 31, 2006

(54) PREFETCHING MEMORY OBJECTS INTO A SHARED CACHE DURING GARBAGE COLLECTION WITH A THREE-FINGER CHENEY SCAN IN A MULTITHREADED PROCESSING ENVIRONMENT

(75) Inventors: Richard L. Hudson, Northampton, MA (US); Hong Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 482 days.

(21) Appl. No.: 10/327,557

(22) Filed: Dec. 20, 2002

(65) Prior Publication Data

US 2004/0122876 A1    Jun. 24, 2004

(51) Int. Cl.
*G06F 12/00*    (2006.01)

(52) U.S. Cl. .................. 707/206; 707/205; 711/170; 711/165; 710/56

(58) Field of Classification Search ............... 707/205, 707/206; 711/170, 173, 165, 118; 710/56
See application file for complete search history.

(56) References Cited

U.S. PATENT DOCUMENTS

| | | | | |
|---|---|---|---|---|
| 5,590,332 | A * | 12/1996 | Baker | 717/151 |
| 5,687,368 | A * | 11/1997 | Nilsen | 707/103 R |
| 6,604,182 | B1 * | 8/2003 | Sexton et al. | 711/170 |
| 6,662,274 | B2 * | 12/2003 | Subramoney et al. | 711/137 |
| 6,886,085 | B1 * | 4/2005 | Shuf et al. | 711/159 |
| 2002/0095453 | A1 * | 7/2002 | Steensgaard | 709/107 |
| 2002/0199065 | A1 * | 12/2002 | Subramoney et al. | 711/137 |

OTHER PUBLICATIONS

Amir Roth and Gurindar S. Sohi "Effective jump-pointer prefetching for linked data structures" May 1999, ACM SIGARCH Computer Architecture News , Proceedings of the 26th annual international symposium on Computer architecture, vol. 27 issue 2, p111-121.*

C. J. Cheney, "A nonrecursive list compacting algorithm", Nov. 1970, Communications of the ACM, vol. 13 Issue 11, pp677-678.*

Hans Boehm "Reducing Garbage Collector Cache Misses", Proceedings of the 2000 International Symposium on Memory Management, 2000.

C.J. Cheney. "A non-recursive list compacting algorithm", Communications of the ACM, 13(11):677-8, Nov. 1970.

Chi-Keung Luk, Todd C. Mowry, "Compiler-based Prefetching for Recursive Data Structures," Proceedings of the seventh international conference on Architectural support for programming languages and operating systems, vol. 30 , 31 Issue 5 , 9, Oct. 1996.

* cited by examiner

*Primary Examiner*—Hong Kim
(74) *Attorney, Agent, or Firm*—Shireen I. Bacon

(57) ABSTRACT

In one embodiment a memory management method uses a third finger fetching pointer thread operating on memory objects distributed in a second memory space between a scan pointer thread and an allocation pointer thread to fetch objects in the second memory space prior to them being scanned. The fetching thread is moved to a next memory slot in the second memory space when the scanned memory slot does not hold a pointer to an object in the first memory space. The memory object is prefetched into a cache shared with an allocation pointer thread when the scanned memory slot holds a pointer to an object in the first space.

30 Claims, 4 Drawing Sheets

PREFETCHING MEMORY OBJECTS INTO A SHARED CACHE DURING GARBAGE COLLECTION WITH A THREE-FINGER CHENEY SCAN IN A MULTITHREADED PROCESSING ENVIRONMENT

FIELD OF THE INVENTION

The present invention relates to computing system software. More particularly, this invention relates to memory management.

BACKGROUND

Reliable operation of software systems generally requires memory management that automatically ensures availability of dynamically allocated memory. Often known as garbage collection, this automatic task is performed by a garbage collector which recycles memory that will never be used again. Automatic garbage collection avoids the need for a programmer to explicitly deallocate memory blocks, and helps eliminate problems associated with memory leaks and premature memory frees. Objects are a collection of fields and methods. The fields can include slots which hold references to other objects, possible recursively. Since garbage collection can also simplify program development by reducing the need to manage storage used to instantiate objects, it is often available in modern languages, including Java and its variants, or C# (Microsoft Common Language Runtime (CLR)).

However, garbage collection does have a substantial associated runtime overhead, which overhead being in turn dependent on the specific garbage collection algorithm employed. Due to the well known Halting Problem, in general it is not possible for a garbage collector to determine exactly which memory objects are still alive and will be used by the program in the future. All garbage collectors use some approximation to determine aliveness of memory. In a "tracing" garbage collection, objects are determined to be alive if they are reachable. "Copying" garbage collection is a kind of tracing garbage collection that operates by relocating reachable objects (scavenging) and reclaiming objects left behind (such objects being unreachable and therefore dead).

For example, a two-space copy collector is a simple form of a copying garbage collector that divides available memory into two spaces. Memory objects can be in the first space, also known as the "from" or "old" space. Objects can be moved or allocated in the second space, also known as the "to" or "new" space. The first two spaces are collectively referred to as the area being collected or C space. Finally an object can be in a third uncollected space or U space. Objects are allocated in the first space until it is full. This space then becomes the "old" space. The reachable objects are then copied into the other "new" space (usually using a Cheney scan) and the previously allocated memory of the old space is reclaimed for the available memory pool. The Cheney scan is particularly efficient algorithm that requires no stack or other auxiliary space to maintain the list of memory objects not yet scanned. Allocation continues in the new space until it is filled, with the process then being repeated in reverse. As will be appreciated, improvements in copying efficiency of reachable objects translate into improvement in garbage collection and overall system performance.

DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Figure 1:
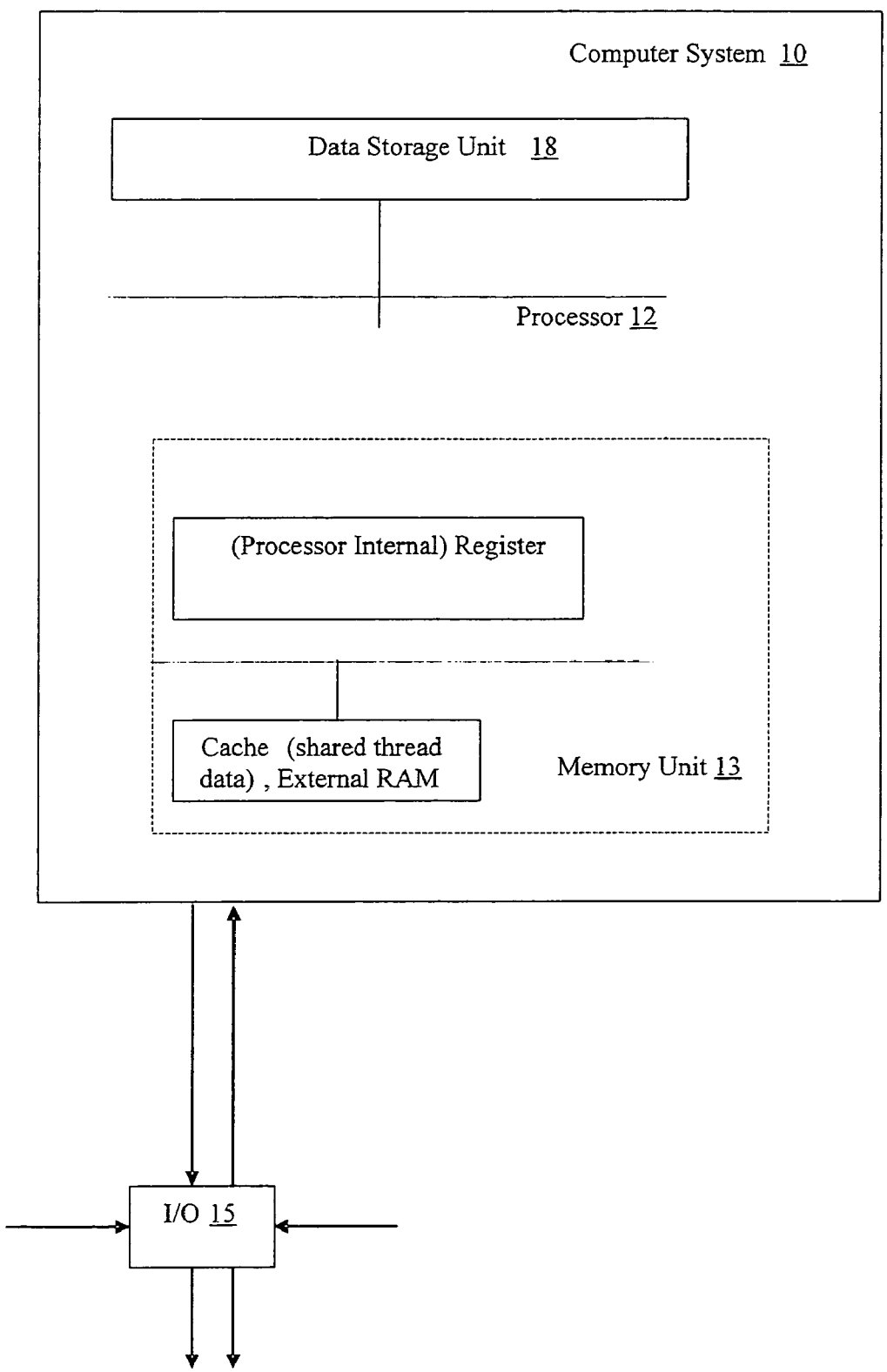
FIG. 1 schematically illustrates a computing system supporting multithreaded processing.

FIG. 1 generally illustrates a computing system 10 having a processor 12 and memory system 13 (which can be external cache memory, external RAM, and/or memory partially internal to the processor) for executing instructions that can be externally provided in software as a computer program product and stored in data storage unit 18. The processor 12 is capable of supporting multiple threads (a thread is a sequence of executing instructions that can run independently of other threads yet can directly share data with other threads). Threading support is commonly available in association with computer languages such as Java and C#.

The computer system 10 of the present invention may include one or more I/O (input/output) devices 15, including a display device such as a monitor. The I/O devices may also include an input device such as a keyboard, and a cursor control such as a mouse, trackball, or trackpad. In addition, the I/O devices may also include a network connector such that computer system 10 is part of a local area network (LAN) or a wide area network (WAN).

Examples of a system 10 include, but are not limited or restricted to a computer (e.g., desktop, a laptop, a server, blade server, a workstation, a personal digital assistant, etc.) or any peripherals associated therewith; communication equipment (e.g., telephone handset, pager, etc.); a television set-top box and the like. A "connection" or "link" is broadly defined as a logical or physical communication path such as, for instance, electrical wire, optical fiber, cable, bus trace, or even a wireless channel using infrared, radio frequency (RF), or any other wireless signaling mechanism. In addition, the term "information" is defined as one or more bits of data, address, and/or control. "Code" includes software or firm-ware that, when executed, performs certain functions. Examples of code include an application, operating system, an applet, boot code, or any other series of instructions, or microcode (i.e. code operating at privilege level and below OS).

Alternatively, the logic to perform the methods and systems as discussed above, could be implemented in additional computer and/or machine readable media, such as discrete hardware components as large-scale integrated circuits (LSI's), application-specific integrated circuits (ASIC's), microcode, or firmware such as electrically erasable programmable read-only memory (EEPROM's); or spatially distant computers relaying information through electrical, optical, acoustical and other forms of propagated signals (e.g., radio waves or infrared optical signals).

In one embodiment, a computer program product readable by the data storage unit 18 may include a machine or computer-readable medium having stored thereon instructions which may be used to program (i.e. define operation of) a computer (or other electronic devices) to perform a process according to the present invention. The computer-readable medium of data storage unit 18 may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like, including any methods to upgrade or reprogram or generate or activate or reserve activation of microcode enhancement).

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

In one embodiment, the methods of the present invention are embodied in machine-executable instructions directed to control operation of the computing system 10, and more specifically, operation of the processor, register, cache memory, and general memory. The instructions can be used to cause a general-purpose or special-purpose processor that is programmed with the instructions to perform the steps of the present invention. Alternatively, the steps of the present invention might be performed by specific hardware components (including microcode) that contain hardwired logic for performing the steps, or by any combination of programmed computer components and custom hardware components.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as pseudocode that generically defines program flow logic, by formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Figure 2:
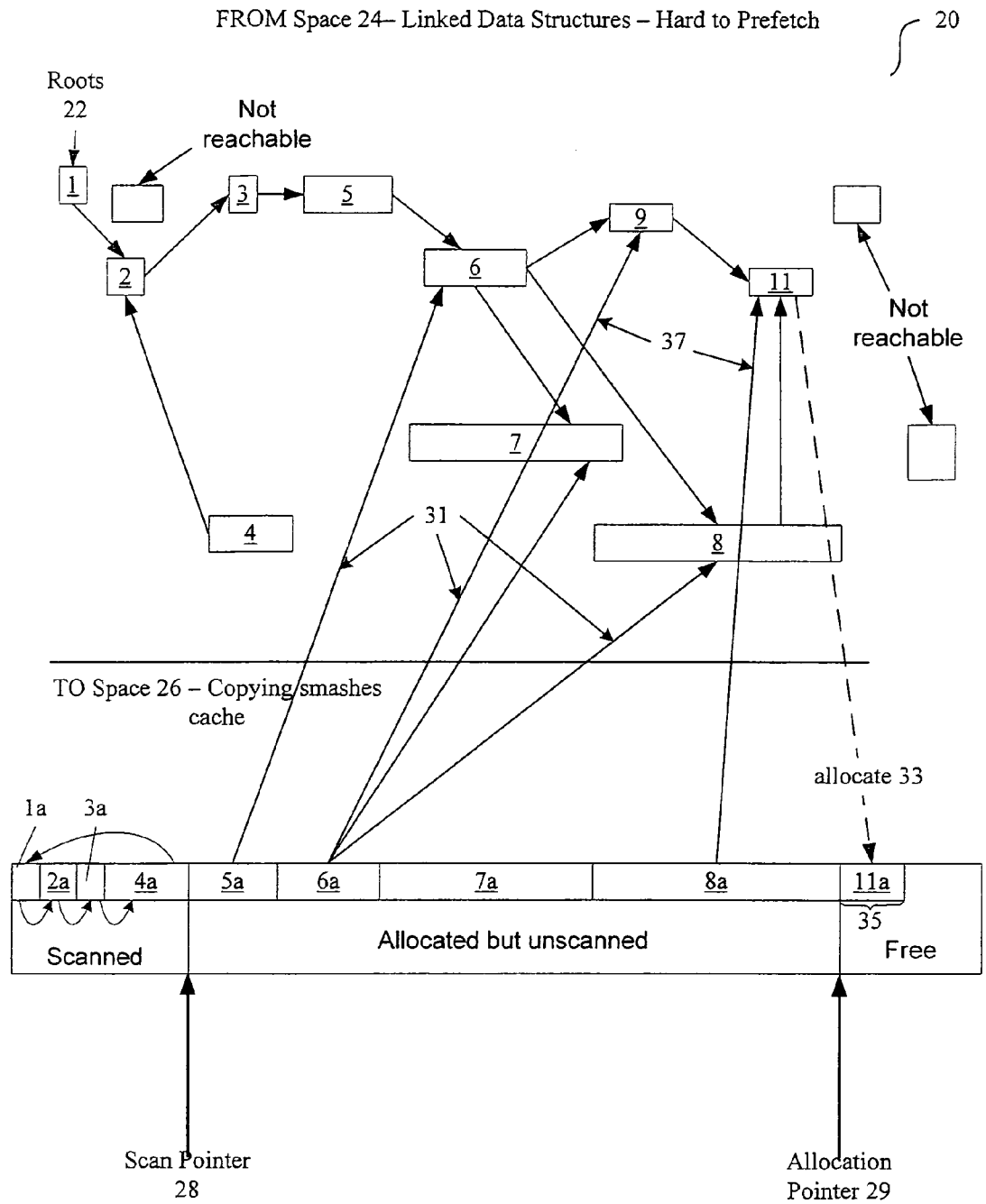
FIG. 2 is a Prior Art illustration of operation of a Cheneyu scan.

FIG. 2 is a representation of Cheney scanning as known in the Prior Art. As seen in FIG. 2, a classic Cheney scan 20 starts by copying objects 22 that are reachable (1–9, 11) from the roots 22 into the "to" space 26. The objects (see 1a–8a) are allocated sequentially using an "allocation pointer" 29 which marks the frontier between the allocated and unallocated areas of the Cheney space 26. The objects 1a–8a are scanned using a scan pointer 28 that starts with the first object allocated, 1a, and scans the objects sequentially left to right. If the Cheney Scan encounters a slot (such as, for example, 5a and/or 6a) referring to 31 (in other words, holds a pointer to) a memory object in the "from" 24 space that already has a "to" space 26 version (see. e.g., 6a, 7a, and 8a), the slot is updated (see 42, 44 and 46 of FIG. 4) to refer to the "to" version (6a, 7a, and 8a, respectively). If the Cheney Scan encounters a pointer (37) to an object in the "from" space 24 that has not been moved into the "to" space (such as, for example, memory object 11), then a version 11a of the object is allocated 33 in the "to" space 26 using the allocation pointer 29, thus moving the memory object 11 into the "to" space 26. The allocation pointer 29 is bumped by the size 35 of the object 11a. Finally, the slot 6a holding the "from" object's 11 address is updated to point to the new "to" version of the object 11a. This technique is sometimes called the two-finger technique where the right finger represents the allocation pointer 29 and the left finger represents the scan pointer 28. Scanning moves the left finger and allocating moves the right finger. The Cheney scan terminates when the scan pointer 28 catches up with the allocation pointer 29, in other words the fingers come together. Since "from" space 24 is bounded the algorithm is guaranteed to terminate.

Unfortunately, in operation the Cheney Scan of FIG. 2 frequently encounters an object in the "from" space 24 that is not in the memory cache (see, e.g., cache of memory unit 13 in FIG. 1. The Cheney scan stalls until the object can be pulled into the cache, reducing garbage collection performance.

Figure 3:
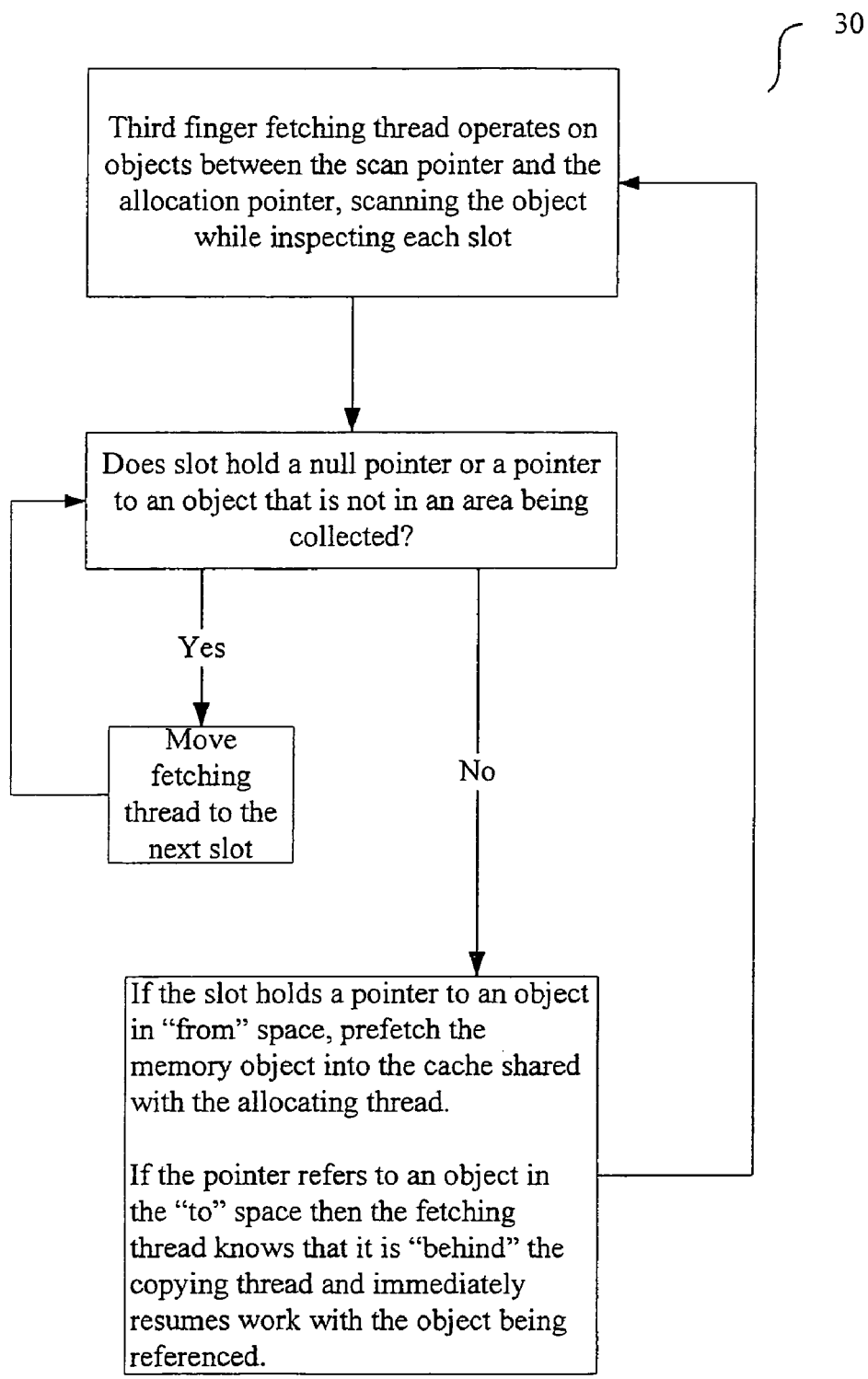
FIG. 3 illustrates program logic of a modified Cheney scan using a multiple threads.

As seen with reference to procedure 30 of FIG. 3, a Cheney scan stall can be eliminated by use of multi-threaded computing systems that share a common cache. A "third finger" is used to assist the scanner by fetching object in the first "from" memory space into the cache ahead of the scan pointer. This third finger fetching thread does its work on objects between the scan pointer and the allocation pointer. It scans the object inspecting each slot. If the slot holds a null pointer or a pointer to an object that is not in an area being collected then it is considered uninteresting and the fetching thread moves to the next slot. If the slot holds a pointer to an object in "from" space then that object is prefetched into the cache shared with the allocating thread. If the pointer refers to an object in the second "to" space then the fetching thread knows that it is "behind" the copying thread and immediately resumes work with the object being referenced. In other words it skips ahead to an object that has not been scanned. This technique results in inexpensive non-blocking coordination between the two threads.

Figure 4:
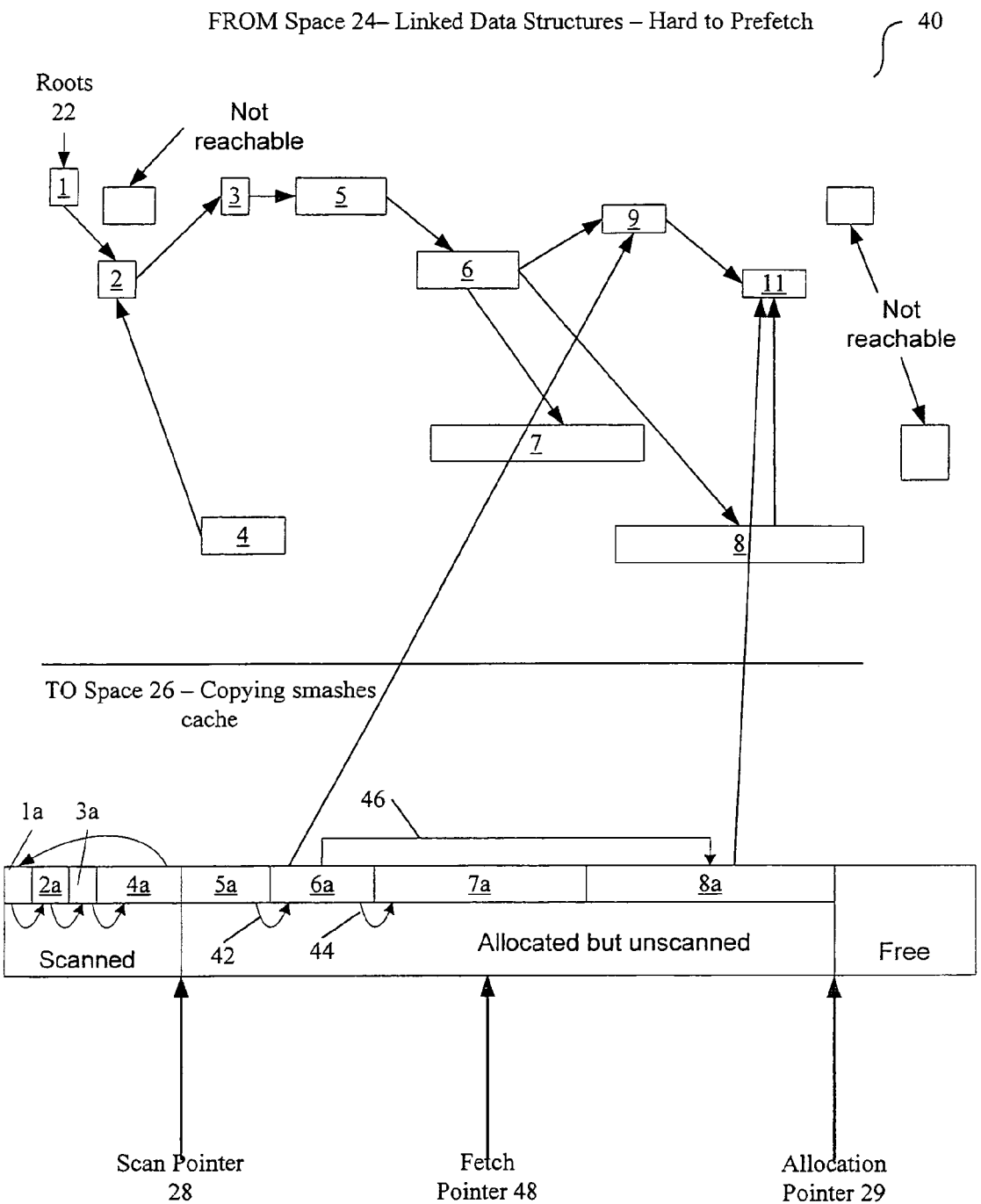
FIG. 4 illustrates operation of a modified Cheney scan using a "third finger"pointer.

FIG. 4 shows how the fetching thread updates pointers ahead of scan pointer. As the fetching thread is about to inspect the next object (see fetch pointer 48) it will notice that if there is a pointer to an object in the first memory "from" space that has not been copied and it will prefetch that object so that the scanning thread potentially will not suffer a cache miss.

On strong memory access ordering machines, the allocating pointer clears the virtual table ("vtable") just past the frontier pointer prior to copying the object so that the fetching thread will see the null vtable and know that it has reached the frontier pointer. When the fetching thread encounters a slot holding a reference to an object that has already been moved then it updates the slot to refer to the "to" version of the object. This helps the allocating thread by eliminating the need to load the "from" object and then parse the object header to determine if it has already been moved. On weak memory access ordering machines the fetching thread must periodically load the allocation pointer and scan up to the allocation pointer.

There are several benign race conditions introduced by this procedure. First it is possible for the allocating thread to move past the fetching thread. The allocating thread is unaffected. However, the fetching thread will encounter objects with pointers into the "to" space. This is the only situation where the fetching thread will encounter such pointers. If the pointer it encounters is to an object to the right of the object being scanned then the fetching pointer can resume fetching at that object since the allocating thread is at least that far along.

As the fetch thread and the allocation thread pass each other it is possible that both threads can attempt to update a slot in the object being scanned. Since both threads are attempting to update the pointer with the same value this race condition is benign and the algorithm remains correct.

Note that the fetching thread never copies an object or updates the allocation pointer. This job is reserved for the allocating thread so we do not have to synchronize the allocation pointer. The fetching thread can pass the allocation pointer and this will be detected since memory beyond the allocation pointer is zeroed. Since the allocation pointer will never point past initialized memory the worse that can happen is that the fetching thread will get an out of date allocation pointer and stop scanning prematurely. There is nothing that the fetching thread must do to ensure that the algorithm is correct, it merely attempt to off load work that is usually done by the allocating thread, thus speeding up the allocation thread.

To better understand this procedure, the following pseudocode illustrates one possible implementation scheme for the modified Cheney scan:

```
// Allocating thread will clear vtable at frontier pointer.
FetchingThread () {
    While (the fetch pointer != allocation_ptr) {
        Fetch_ptr = Fetch_object_scan(fetch_ptr);
    }
}
void FetchObjectScan(Java_java_lang_Object *obj) {
    Java_java_lang_Object *slot = first_slot (obj)
    Java_java_lang_Object *result = obj;
    // Inspect all slots in the object.
    while (slot) {
        if (*slot is in a collected area) { // is the object interesting
            if (*slot has already been forwared) {
                *slot = get_forwarded_obj_for_fetch(slot);
            }
            else if (*slot has already been updated.) {
                // we are behind the allocating thread
                // skip to the right to try and catchup.
                If (*slot > slot) {
                    // *slot has been allocated and is ahead of us so skip to
                    // scanning that object.
                    Return *slot;
                } else {
                    // object is behind so move ahead as quickly as possible.
                    result += get_object_size(obj);
                    return result;
                }
            } else {
                // *slot is uninteresting since it is not in a collected area.
            }
            slot = get_next_slot (obj);
    }
    result +=get_object_size(obj);
    return result;
}
Java_java_lang_Object *get_forwarded_obj_for_fetch (Java_java_lang_Object *obj)
{
    if (is_forwarded(*slot)) {
        return get_forwarded(*slot);
    } else {
        // fetch the object for the allocating thread.
        unsigned int size = get_object_size(*slot)
        prefetch(*slot, size);
    }
}
Java_java_lang_Object *get_forwarded_obj_for_alloc_thread
                                        (Java_java_lang_Object *obj)
{
    if (is_forwarded(*slot)) {
        return get_forwarded(*slot);
    } else {
        Java_ja va_lang_Object *forwared_ptr = MARK_FORWARD (allocation_ptr);
        unsigned int size = get_object_size(*slot);
        // we need to copy this object.
        Memcpy(*slot, allocation_ptr, size);
        Allocation_ptr += size;
        *allocation_Ptr = NULL;   // Clear next field (the vtable) to indicate
                                  // allocation frontier to prefetching thread.
        *slot = forwarded_ptr;
    }
```

-continued

```
}
void Allocating_Thread () {
    While (allocation_pointer != scanning_pointer) {
        scanning_ptr = cheney_scan_object(scanning_ptr);
    }
}
// Return a pointer to the next object to scan.
void* CheneyScanObject (Java_java_lang_Object *obj) {
    Java_java_lang_Object *slot = first_slot(obj)
    Java_java_lang_Object *result = obj;
    while (slot) {
        if (*slot is in collected area) { // is the object interesting
            if (is_forwarded_p(*slot))) {
                *slot = **slot;
            }
        } else if (*slot has not been moved) {
            // Move it, remember where we moved it and update the slot.
            memcopy (*slot, allocation_ptr, get_object_size (*slot));
            **slot = allocation_ptr;    // Remember to version in from
            *slot = allocation_ptr;     // Update the slot
            allocation_ptr += get_object_size(*slot);
        } else {
            // *slot is not interesting.
        }
    }
    result +=get_object_size(obj);
    return result;
}
```

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

The claimed invention is:

1. A memory management method comprising:
    having a fetching pointer operate on memory objects distributed in a second memory space between a scan pointer and an allocation pointer, scanning the memory objects to find slots holding pointers to objects in a first memory space,
    moving the fetching pointer to a next memory slot in the second memory space when the scanned memory slot does not hold a pointer to an object in the first memory space, and
    prefetching the memory object in the first memory space into a cache shared with thread supporting the allocation pointer when the scanned memory slot holds a pointer to an object in the first memory space.

2. The memory management method of claim 1, wherein the fetching pointer is moved to the next memory slot upon scanning a null pointer.

3. The memory management method of claim 1, wherein the fetching pointer is moved to the next memory slot when a pointer to an object that is not in an area being collected is encountered.

4. The memory management method of claim 1, further comprising updating the fetching pointer to equal the scanning pointer when a slot is encountered that holds a pointer to an object in the second space.

5. The memory management method of claim 1, wherein the thread supporting the allocating pointer clears a virtual table (vtable) just past the frontier pointer prior to copying the memory object to make the fetching thread see a null vtable.

6. A method of garbage collection comprising:
    dividing collected memory into first and second memory spaces,
    scanning the second memory space with a fetching pointer, a scan pointer, and an allocation pointer to determine which memory objects to copy to the second memory space;
    moving the fetching pointer to a next memory slot in the second memory space when the scanned memory slot does not hold a pointer to an object in the first memory space, and
    prefetching the memory object into a cache shared with thread supporting the allocation pointer when the scanned memory slot holds a pointer to an object in the first space.

7. The memory management method of claim 5, wherein the fetching pointer is moved to the next memory slot upon scanning a null pointer.

8. The memory management method of claim 5, wherein the fetching pointer is moved to the next memory slot when a pointer to an object that is not in an area being collected is scanned.

9. The memory management method of claim 5, further comprising referring the pointer to an object in the second memory space when the fetching pointer is behind the copying pointer thread.

10. The memory management method of claim 5, wherein the thread supporting the allocating pointer clears a vtable just past the frontier pointer prior to copying the memory object to make the fetching thread see a null vtable.

11. An article comprising a storage medium having stored thereon instructions that when executed by a machine result in memory management comprising:

having a fetching pointer operate on memory objects distributed in a second memory space between a scan pointer and an allocation pointer, scanning the memory objects to find slots holding pointers to objects in a first memory space, moving the fetching pointer to a next memory slot in the second memory space when the scanned memory slot does not hold a pointer to an object in the first memory space, and prefetching the memory object in the first memory space into a cache shared with thread supporting the allocation pointer when the scanned memory slot holds a pointer to an object in the first memory space.

12. The article comprising a storage medium having stored thereon instructions of claim 11, wherein the fetching pointer is moved to the next memory slot upon scanning a null pointer.

13. The article comprising a storage medium having stored thereon instructions of claim 11, wherein the fetching pointer is moved to the next memory slot when a pointer to an object that is not in an area being collected is encountered.

14. The article comprising a storage medium having stored thereon instructions of claim 11, further comprising updating the fetching pointer to equal the scanning pointer when a slot is encountered that holds a pointer to an object in the second space.

15. The article comprising a storage medium having stored thereon instructions of claim 11, wherein the thread supporting the allocating pointer clears a vtable just past the frontier pointer prior to copying the memory object to make the fetching thread see a null vtable.

16. An article comprising a storage medium having stored thereon instructions that when executed by a machine result in garbage collection comprising:

dividing collected memory into first and second memory spaces, scanning the second memory space with a fetching pointer, a scan pointer, and an allocation pointer to determine which memory objects to copy to the second memory space;

moving the fetching pointer to a next memory slot in the second memory space when the scanned memory slot does not hold a pointer to an object in the first memory space, and prefetching the memory object into a cache shared with thread supporting the allocation pointer when the scanned memory slot holds a pointer to an object in the first memory space.

17. The article comprising a storage medium having stored thereon instructions of claim 16, wherein the fetching pointer is moved to the next memory slot upon scanning a null pointer.

18. The article comprising a storage medium having stored thereon instructions of claim 16, wherein the fetching pointer is moved to the next memory slot when a pointer to an object that is not in an area being collected is scanned.

19. The article comprising a storage medium having stored thereon instructions of claim 16, further comprising referring the pointer to an object in the second memory space when the fetching pointer is behind the copying pointer thread.

20. The article comprising a storage medium having stored thereon instructions of claim 16, wherein the thread supporting the allocating pointer clears a vtable just past the frontier pointer prior to copying the memory object to make the fetching thread see a null vtable.

21. A memory management system comprising:

a processor coupled to a memory system, the processor executable to operate on memory objects in the memory system, the memory objects being distributed in a second memory space between a scan pointer and an allocation pointer, the system operating to scan memory the objects to find slots holding pointers to objects in a first memory space, move a fetching pointer to a next memory slot in the second memory space when the scanned memory slot does not hold a pointer to an object in the first memory space, and prefetch the memory object in the first space into a cache shared with thread supporting the allocation pointer when the scanned memory slot holds a pointer to an object in the first memory space.

22. The memory management method of claim 21, wherein the fetching pointer is moved to the next memory slot upon scanning a null pointer.

23. The memory management system of claim 21, wherein the fetching pointer is moved to the next memory slot when a pointer to an object that is not in an area being collected is encountered.

24. The memory management system of claim 21, further comprising updating the fetching pointer to equal the scanning pointer when a slot is encountered that holds a pointer to an object in the second space.

25. The memory management method of system 21, wherein the thread supporting the allocating pointer clears a vtable just past the frontier pointer prior to copying the memory object to make the fetching thread see a null vtable.

26. A garbage collection system comprising:

a processor coupled to a memory system, the processor executable to operate on memory objects in the memory system, the processor further to divide a portion of the memory system available for garbage collection into first and second memory spaces, the processor further to scan the second memory space with a fetching pointer, a scan pointer, and an allocation pointer to determine which of the memory objects to copy to the second memory space;

the processor further to move the fetching pointer to a next memory slot in the second memory space when the scanned memory slot does not hold a pointer to an object in the first memory space, and the processor further to prefetch the memory object into a cache shared with thread supporting the allocation pointer when the scanned memory slot holds a pointer to an object in the first memory space.

27. The memory management method of claim 26, wherein the fetching pointer is moved to the next memory slot upon scanning a null pointer.

28. The memory management method of claim 26, wherein the fetching pointer is moved to the next memory slot when a pointer to an object that is not in an area being collected is scanned.

29. The memory management method of claim 26, further comprising referring the pointer to an object in the second memory space when the fetching pointer is behind the copying pointer thread.

30. The memory management method of claim 26, wherein the thread supporting the allocating pointer clears a vtable just past the frontier pointer prior to copying the memory object to make the fetching thread see a null vtable.

* * * * *